(12) United States Patent
Miller et al.

(10) Patent No.: US 11,131,315 B2
(45) Date of Patent: Sep. 28, 2021

(54) ADJUSTABLE RIGID SPACER COUPLING

(71) Applicant: ITT MANUFACTURING ENTERPRISES LLC, Wilmington, DE (US)

(72) Inventors: Daniel Stephen Miller, Ontario, CA (US); Paul Walter Behnke, Seal Beach, CA (US)

(73) Assignee: ITT MANUFACTURING ENTIRPISES LLC, Wilmington, DE (US)

(*) Notice: Subject to any disclaimer, the term of this patent is extended or adjusted under 35 U.S.C. 154(b) by 164 days.

(21) Appl. No.: 16/191,016

(22) Filed: Nov. 14, 2018

(65) Prior Publication Data

US 2020/0149539 A1 May 14, 2020

(51) Int. Cl.
*F04D 29/042* (2006.01)
*F04D 3/00* (2006.01)
*F04D 29/043* (2006.01)
*F04D 7/04* (2006.01)
*F04D 29/052* (2006.01)
*F04D 29/053* (2006.01)
*F04D 7/02* (2006.01)

(52) U.S. Cl.
CPC ......... *F04D 29/042* (2013.01); *F04D 3/005* (2013.01); *F04D 7/02* (2013.01); *F04D 7/04* (2013.01); *F04D 29/043* (2013.01); *F04D 29/052* (2013.01); *F04D 29/053* (2013.01)

(58) Field of Classification Search
CPC .... F04D 29/042; F04D 29/043; F04D 29/052; F04D 29/053; F04D 7/00; F04D 7/02; F04D 7/04; F16D 3/06
See application file for complete search history.

(56) References Cited

U.S. PATENT DOCUMENTS 2,830,801 A * 4/1958 Stratienko ............... F16J 15/54
366/249
2,865,299 A * 12/1958 Hornschuch .......... F04D 29/622
415/131
3,216,361 A * 11/1965 Leff ...................... F04D 13/086
415/132
3,468,572 A * 9/1969 Haentjens ............... F16D 1/033
403/337

(Continued)

*Primary Examiner* — David Hamaoui
*Assistant Examiner* — Andrew J Marien
(74) *Attorney, Agent, or Firm* — Hertzberg, Turk & Associates, LLC (57) ABSTRACT

Technologies are described for devices and methods for adjusting a position of impellers within a bowl assembly. The devices may comprise an adjuster at the second end of a spacer coupling. The adjuster may include an adjuster sleeve. The adjuster sleeve may be a cylindrical sleeve. The adjuster sleeve may be threaded on an internal side. The adjuster sleeve may be spaced from the driven hub so that the adjuster sleeve can rotate around a driven shaft. The adjuster sleeve may threadedly mate and engage with an externally threaded first end of the driven shaft when the adjuster sleeve is rotated. The rotation of the adjuster sleeve may adjust a position of the driven shaft with respect to the driven hub and may thereby adjust a position of an impeller attached to a second end of the driven shaft with respect to a stationary bowl.

19 Claims, 5 Drawing Sheets

(56) References Cited

U.S. PATENT DOCUMENTS

| | | | | |
|---|---|---|---|---|
| 4,121,532 A | * | 10/1978 | Coryell, III | B63H 23/32 |
| | | | | 440/83 |
| 4,240,762 A | * | 12/1980 | Lobanoff | F04D 29/044 |
| | | | | 403/24 |
| 5,051,071 A | * | 9/1991 | Haentjens | F04D 13/021 |
| | | | | 417/373 |
| 8,197,192 B2 | * | 6/2012 | Andersson | F04D 15/0033 |
| | | | | 415/121.1 |
| 9,765,785 B2 | * | 9/2017 | Stuessel | F04D 13/02 |
| 2006/0222537 A1 | * | 10/2006 | Kilty | F04D 29/043 |
| | | | | 417/423.6 |
| 2013/0199776 A1 | * | 8/2013 | Amir | E21B 47/008 |
| | | | | 166/255.1 |

* cited by examiner

ADJUSTABLE RIGID SPACER COUPLING

BACKGROUND

Unless otherwise indicated herein, the materials described in this section are not prior art to the claims in this application and are not admitted to be prior art by inclusion in this section.

A pump may be a device that mechanically moves fluids or slurries. A vertical pump may be used for certain applications. A vertical pump may include a driver, a discharge head, a column, and a bowl assembly. An impeller or multiple impellers may be included in the bowl assembly. A rigid coupling, called a spacer, may be axially connected to a driver shaft of the driver at a driver hub and axially connected to a driven shaft connected to the impeller(s) at a driven (pump) hub. The rigid coupling spacer may transmit torque and axial load from the driver shaft to the driven shaft and also allow for ease of maintenance of the pump.

SUMMARY

One embodiment of the invention is a device for adjusting a position of impellers within a bowl assembly of a pump. The device may comprise a spacer coupling. A first end of the spacer coupling may be connected to a drive hub and a second end of the spacer coupling may be connected to a driven hub. The device may comprise an adjuster attached to the second end of the spacer coupling. The adjuster may include an adjuster sleeve. The adjuster sleeve may be a cylindrical sleeve with an internal side and an external side. The adjuster sleeve may be threaded on the internal side. The adjuster sleeve may be spaced from the driven hub so that the adjuster sleeve can rotate around a driven shaft. The adjuster sleeve may threadedly mate and engage with an externally threaded first end of the driven shaft when the adjuster sleeve is rotated. The rotation of the adjuster sleeve may adjust a position of the driven shaft with respect to the driven hub. The rotation of the adjuster sleeve may adjust a position of an impeller attached to a second end of the driven shaft with respect to a stationary bowl assembly of the pump.

Another embodiment of the invention includes a pump system for adjusting a position of impellers within a bowl assembly of a pump. The system may comprise a driver. The system may comprise a drive shaft. The drive shaft may be rotationally driven by the driver. The system may comprise a drive hub. The drive hub may be connected to the drive shaft. The system may comprise a driven hub. The system may comprise a spacer coupling. A first end of the spacer coupling may be connected to the drive hub and a second end of the spacer coupling may be connected to the driven hub. The system may comprise a driven shaft. The driven shaft may be connected to the driven hub at a key proximate to a first end of the driven shaft. The system may comprise a column. The driven shaft may extend through the column. The system may comprise an impeller. The impeller may be attached to a second end of the driven shaft. The system may comprise a bowl assembly. The bowl assembly may be connected to the column. The system may comprise an adjuster attached to the second end of the spacer coupling. The adjuster may include an adjuster sleeve. The adjuster sleeve may be a cylindrical sleeve with an internal side and an external side. The adjuster sleeve may be threaded on the internal side. The adjuster sleeve may be spaced from the driven hub so that the adjuster sleeve can rotate around the driven shaft. The adjuster sleeve may threadedly mate and engage with an externally threaded first end of the driven shaft when the adjuster sleeve is rotated. The rotation of the adjuster sleeve may adjust a position of the driven shaft with respect to the driven hub. The rotation of the adjuster sleeve may adjust a position of an impeller attached to a second end of the driven shaft with respect to the stationary bowl assembly of the pump.

Another embodiment of the invention is a method to adjust a position of an impeller of a pump. The method may comprise rotating an internally threaded cylindrical adjuster sleeve around a driven shaft of a pump. The method may comprise threadedly mating and engaging the internally threaded cylindrical adjuster sleeve with an externally threaded first end of the driven shaft. Rotating the adjuster sleeve may result in the threaded first end of the driven shaft screwing into or out of the internally threaded cylindrical adjuster sleeve. The adjuster sleeve may be at a fixed position with a driven hub. The adjuster sleeve may be spaced from the driven hub so that the adjuster sleeve can rotate around the driven shaft. Rotating the adjuster sleeve may adjust a position of the driven shaft with respect to the driven hub, and thereby may adjust a position of an impeller attached to a second end of the driven shaft with respect to a stationary bowl assembly of the pump.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
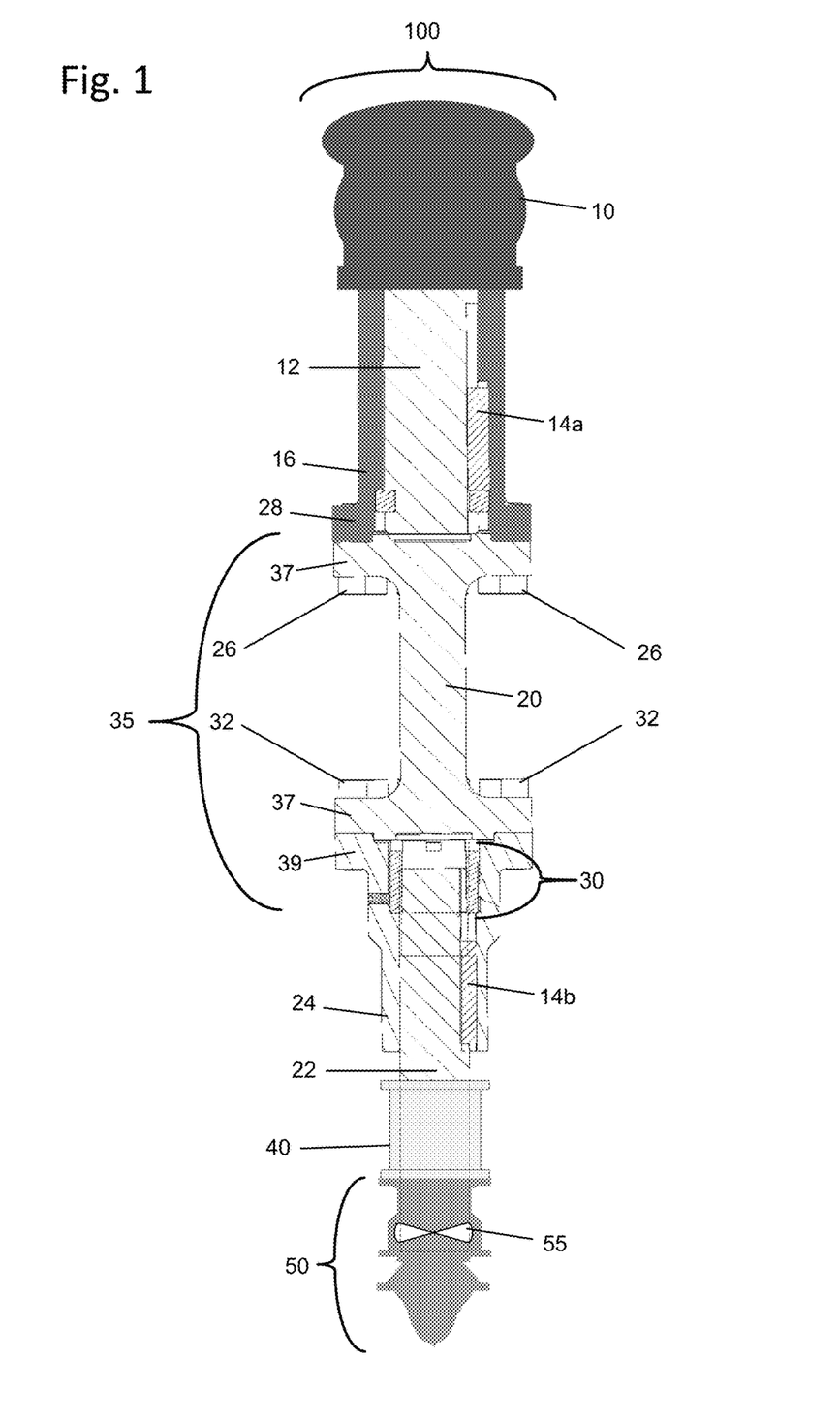
FIG. 1 is a side view illustrating a pump with an adjustable rigid spacer coupling.

FIG. 1 is a side view illustrating a pump with an adjustable rigid spacer coupling, arranged in accordance with at least some embodiments described herein. Pump 100 may include a driver 10, a drive shaft 12, a drive hub 16, an adjustable rigid spacer coupling 35 including a spacer 20, a driven shaft 22, a driven hub 24, a column 40, and a bowl assembly 50. Driver 10 may include a motor which may rotate drive shaft 12 at specified speeds (rev/min). Drive shaft 12 may be attached to drive hub 16 by a key 14a. Key 14a may be secured in groves in drive shaft 12 and drive hub 16 and key 14a may secure drive hub 16 to drive shaft 12 axially such that drive hub 16 rotates with drive shaft 12. Spacer 20 may be attached to drive hub 16 by drive hub bolts 26 through spacer flanges 37 and drive hub flanges 28. Spacer 20 may rotate with drive hub 16 and drive shaft 12. Spacer 20 may also be attached to driven hub 24 with driven hub bolts 32 through spacer flanges 37 and spacer hub flanges 39. Driven hub 24 may rotate with spacer 20, drive hub 16 and drive shaft 12. Driven hub 24 may be attached to driven shaft 22 by key 14b proximate to a first end of driven shaft 22. Key 14b may be secured in groves in driven shaft 22 and driven hub 24 and may secure driven hub 24 to driven shaft 22 axially such that driven shaft 22 rotates with driven hub 24, spacer 20, drive hub 16, and drive shaft 12. Driven shaft 22 may extend through column 40 and be attached to impellers 55 at a second end of driven shaft 22 within bowl assembly 50. Column 40 and bowl assembly 50 may be connected and may be stationary relative to driven shaft 22. Driven shaft 22 may rotate impellers 55 within bowl assembly 50 when driven shaft is rotated. Adjustable rigid spacer coupling 35 may further include adjuster 30. As described in more detail below, adjustable rigid spacer coupling 35 and adjuster 30 may adjust a position of impellers 55 within bowl 50.

Figure 2:
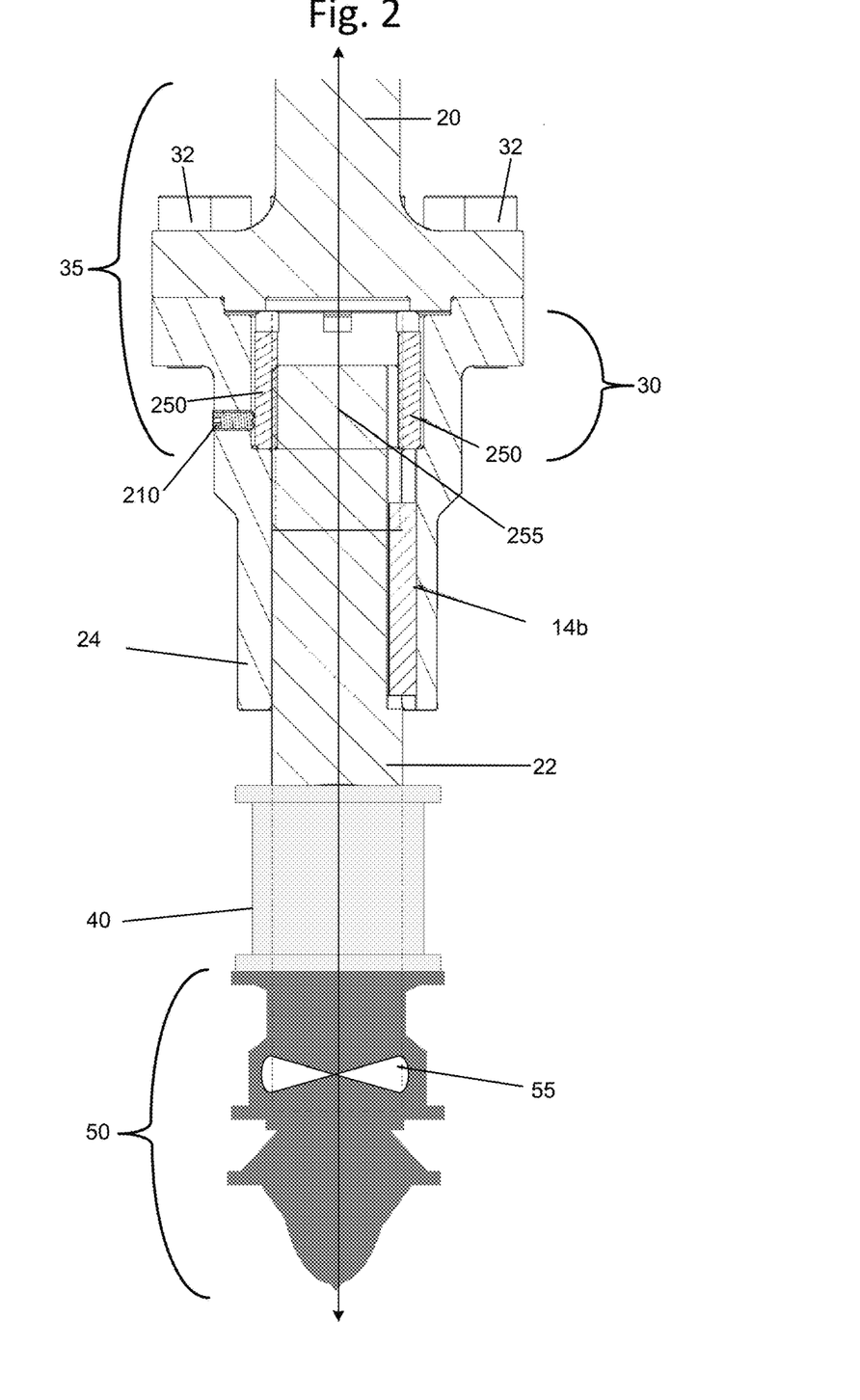
FIG. 2 is a side view illustrating an adjustable rigid spacer coupling attached to a driven hub and a driven shaft.

FIG. 2 is a side view illustrating an adjustable rigid spacer coupling attached to a driven hub and a driven shaft, arranged in accordance with at least some embodiments presented herein. Those components in FIG. 2 that are labeled identically to components of FIG. 1 will not be described again for the purposes of brevity.

In an embodiment, adjuster 30 may include an adjuster sleeve 250. Axis 255 may be a central axis of adjuster sleeve 250 and pump 100. Adjuster sleeve 250 may be at a fixed location within driven hub 24 and may rotate freely along axis 255 with respect to driven hub 24. Adjuster sleeve 250 may be aligned axially with driven shaft 22. Adjuster sleeve 250 may be a cylindrical sleeve with an internal side and an external side. Adjuster sleeve 250 may be threaded on the internal side and may threadedly mate with externally threaded driven shaft 22. Adjuster 30 may be spaced from driven hub 24 so that adjuster sleeve 250 may be able to rotate around driven shaft 22. A set screw 210 may be threaded through an opening defined by walls of driven hub 24 and may be tightened to contact adjuster sleeve 250 and secure an axial position of adjuster sleeve 250 relative to driven hub 24. As described in more detail below, driven shaft 22 may be moved relative to driven hub 24 by rotation of adjuster sleeve 250 and may adjust a position of impellers 55 within bowl assembly 50.

Figure 3:
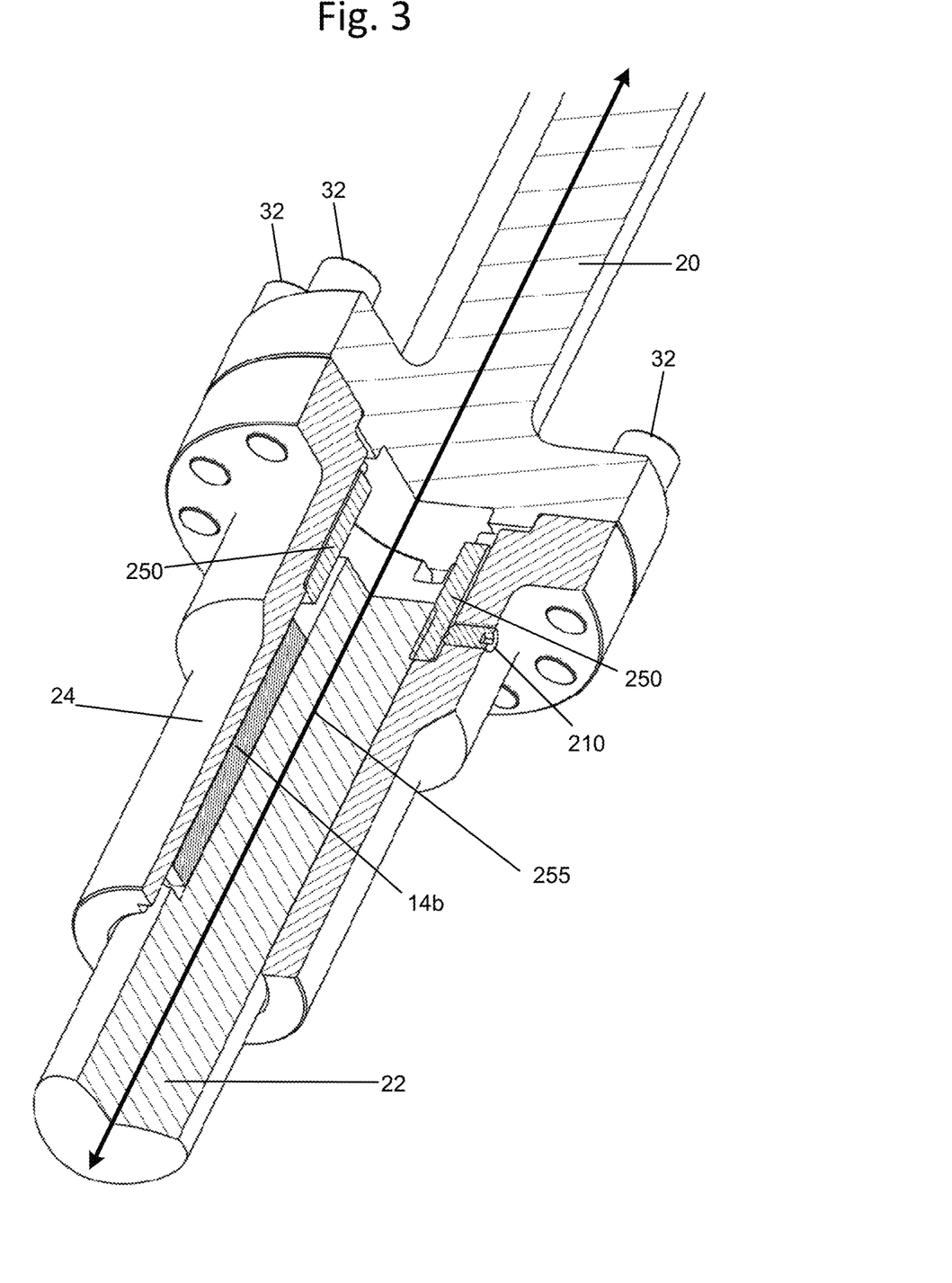
FIG. 3 is a cutout perspective view illustrating an adjustable rigid spacer coupling attached to a driven hub and a driven shaft.

FIG. 3 is a cutout perspective view illustrating an adjustable rigid spacer coupling attached to a driven hub and a driven shaft, arranged in accordance with at least some embodiments presented herein. Those components in FIG. 3 that are labeled identically to components of FIGS. 1-2 will not be described again for the purposes of brevity.

In an embodiment, adjuster sleeve 250 may be at a fixed location within driven hub 24 and may rotate freely along axis 255. Threaded internal side of adjuster sleeve 250 may threadedly mate with externally threaded driven shaft 22. Adjuster sleeve 250 may be spaced from driven hub 24 so that adjuster sleeve 250 may be able to rotate around driven shaft 22 and increase or decrease an amount of threaded mating between adjuster sleeve 250 and driven shaft 22. An amount of threaded mating between adjuster sleeve 250 and driven shaft 22 may adjust a positioning of threaded end of driven shaft 22 relative to driven hub 24. Set screw 210, threaded through an opening defined by walls of driven hub 24, may be tightened to contact and secure a rotational position of adjuster sleeve 250 relative to driven hub 24. As described in more detail below, driven shaft 22 may be moved relative to driven hub 24 by rotation of adjuster sleeve 250 and may adjust a position of impellers 55 within bowl assembly 50.

Figure 4:
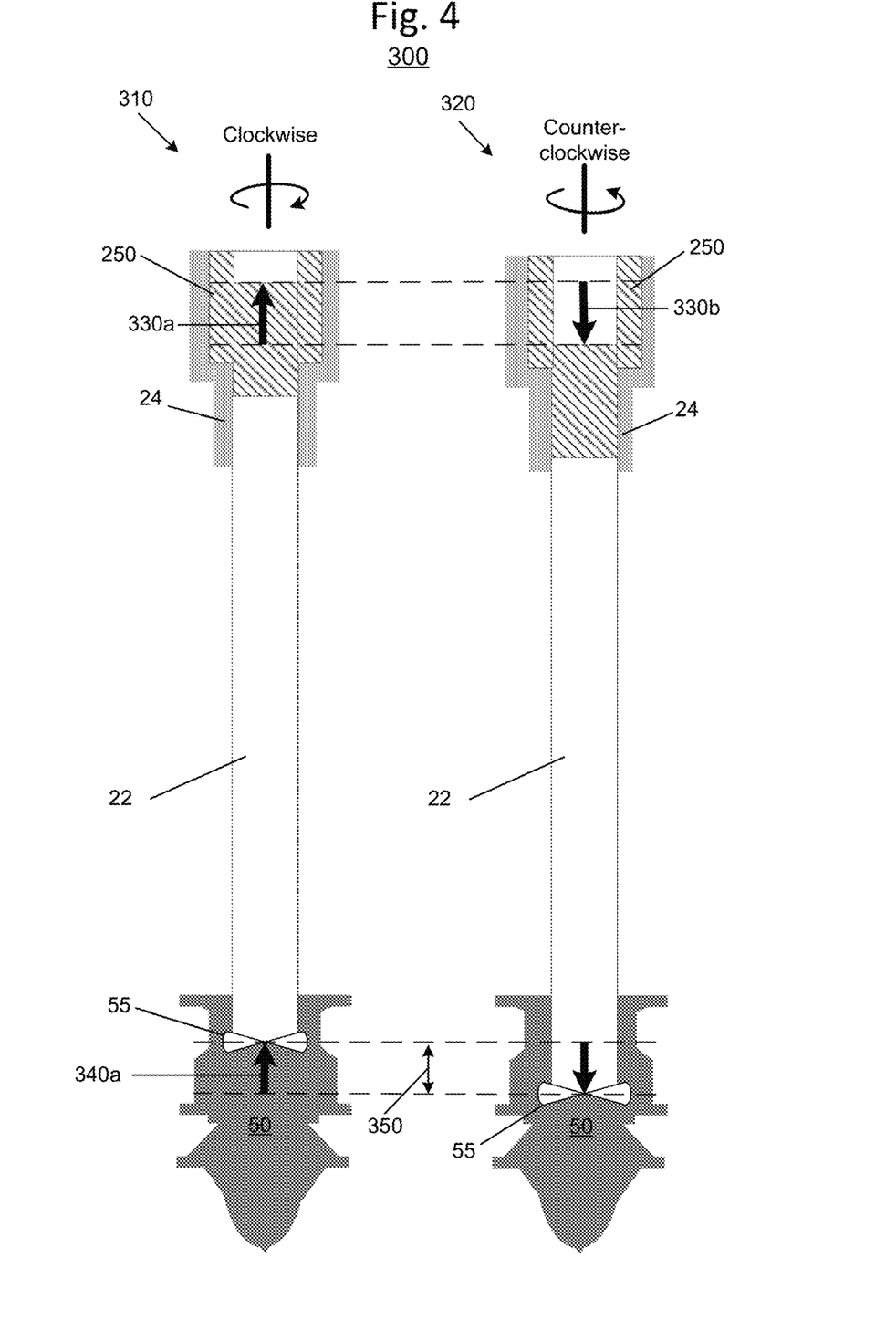
FIG. 4 illustrates an example system that can be utilized to adjust a position of an impeller within a bowl assembly.

FIG. 4 illustrates an example system that can be utilized to adjust a position of an impeller within a bowl assembly, arranged in accordance with at least some embodiments presented herein. Those components in FIG. 4 that are labeled identically to components of FIGS. 1-3 will not be described again for the purposes of brevity.

System 300 may include adjuster sleeve 250, driven shaft 22, driven hub 24, bowl assembly 50, and impeller 55. At 310 adjuster sleeve 250 may be rotated in a first direction such as clockwise relative to an upper end of driven shaft 22. Threaded end of driven shaft 22 may threadedly engage with threaded adjuster sleeve 250. Threaded end of driven shaft 22 threadedly engaging with threaded adjuster sleeve 250 may result in driven shaft 24 screwing into threaded adjuster sleeve 250. Driven shaft 24 screwing into threaded adjuster sleeve 250 may adjust a position of driven shaft 22 upward (as indicated by arrow 330a) with respect to driven hub 24. Impellers 55 connected to driven shaft 22 may likewise adjust upward with driven shaft 24 and may thus adjust upward with respect to stationary bowl assembly 50 (as indicated by adjustment arrow 340a). Adjustment 350 may be any linear distance within a length of adjuster sleeve 250 and may not be limited to finite adjustment increments. Adjuster sleeve 250 may allow adjustment 350 to be any linear distance within a length of adjuster sleeve 250 within a tolerance of +/−0.002 inches.

At 320 adjuster sleeve 250 may be rotated in a second opposite direction such as counter-clockwise relative to upper end of driven shaft 22. Threaded end of driven shaft 22 may threadedly engage with threaded adjuster sleeve 250. Threaded end of driven shaft 22 threadedly engaging with threaded adjuster sleeve 250 may result in driven shaft 24 unscrewing out of threaded adjuster sleeve 250. Driven shaft 24 unscrewing out of threaded adjuster sleeve 250 may adjust a position of driven shaft 22 downward (as indicated by arrow 330b) with respect to driven hub 24. Impellers 55 connected to driven shaft 22 may likewise adjust downward with driven shaft 24 and may thus adjust downward with respect to stationary bowl assembly 50 (as indicated by adjustment arrow 340b). Adjustment 350 may be any linear distance within a length of adjuster sleeve 250 and may not be limited to finite adjustment increments.

A device in accordance with the present disclosure may provide an adjustable spacer coupling that may be adjusted at any angle. A device in accordance with the present disclosure may provide an adjustable spacer coupling that is not limited to finite adjustment increments. A device in accordance with the present disclosure may provide an adjustable spacer coupling that is constructed out of steel and has a comparable weight to an aluminum coupling.

A device in accordance with the present disclosure may provide an adjustable spacer coupling which may limit axial displacement of shafting for a pump. A device in accordance with the present disclosure may provide an adjustable spacer coupling that is in close clearance with the connecting shafts and has stable performance under compressive loads. A device in accordance with the present disclosure may provide an adjustable spacer coupling that locates an axial adjuster inside of a pump side hub and provide more precise and reliable shaft to shaft alignment. A device in accordance with the present disclosure may provide an adjustable spacer coupling that has a reduced mass over previous spacer couplings which included a large adjuster flange. A device in accordance with the present disclosure may provide an adjustable spacer coupling that eliminates fasteners passing through the adjuster. A device in accordance with the present disclosure may provide an adjustable spacer coupling which may provide more precise impeller to bowl assembly alignment.

Figure 5:
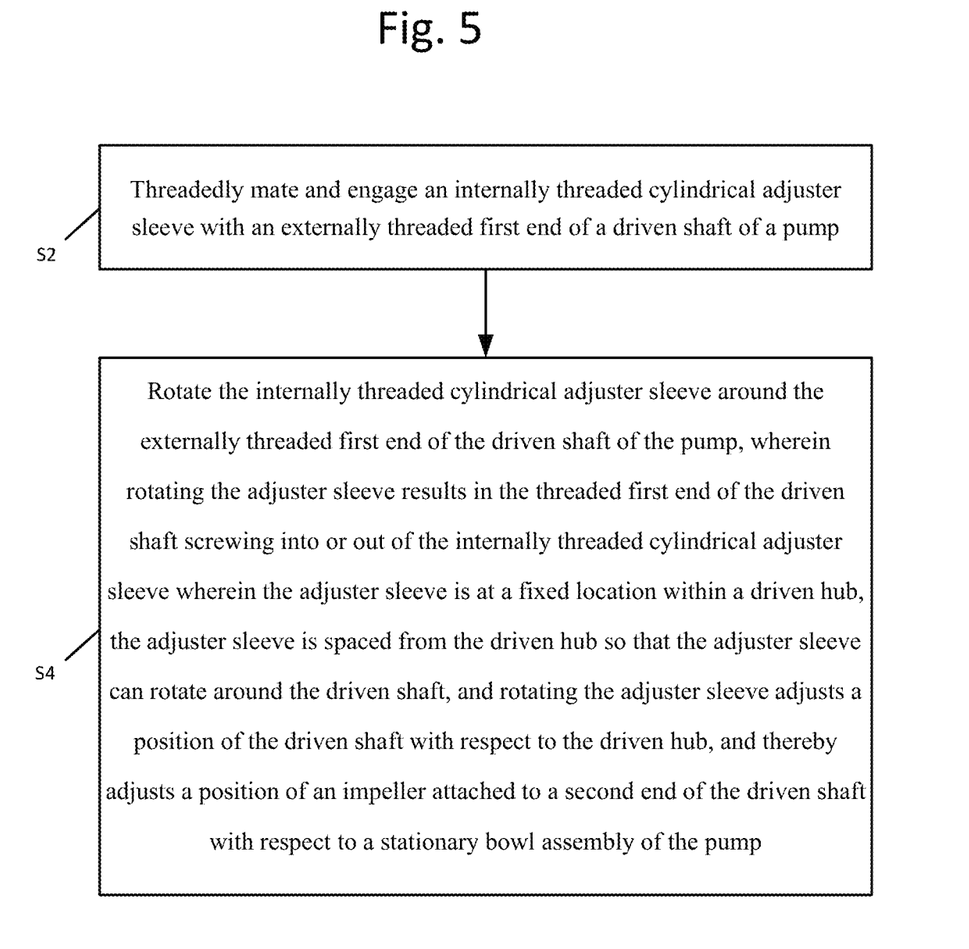
FIG. 5 illustrates a flow diagram for an example process to adjust a position of an impeller within a bowl assembly; all arranged according to at least some embodiments described herein.

FIG. 5 illustrates a flow diagram for an example process to adjust a position of an impeller within a bowl assembly, arranged in accordance with at least some embodiments presented herein. The process in FIG. 5 could be implemented using, for example, system 300 discussed above. An example process may include one or more operations, actions, or functions as illustrated by one or more of blocks S2, and/or S4. Although illustrated as discrete blocks, various blocks may be divided into additional blocks, combined into fewer blocks, or eliminated, depending on the desired implementation.

Processing may begin at block S2, "Threadedly mate and engage an internally threaded cylindrical adjuster sleeve with an externally threaded first end of a driven shaft of a pump". At block S2, an internally threaded cylindrical adjuster sleeve is threadedly mated and engaged with an externally threaded first end of a driven shaft of a pump.

Processing may continue from block S2 to block S4, "Rotate the internally threaded cylindrical adjuster sleeve around the externally threaded first end of the driven shaft of the pump, wherein rotating the adjuster sleeve results in the threaded first end of the driven shaft screwing into or out of the internally threaded cylindrical adjuster sleeve wherein the adjuster sleeve is at a fixed position with a driven hub, the adjuster sleeve is spaced from the driven hub so that the adjuster sleeve can rotate around the driven shaft, and rotating the adjuster sleeve adjusts a position of the driven shaft with respect to the driven hub, and thereby adjusts a position of an impeller attached to a second end of the driven shaft with respect to a stationary bowl assembly of the pump". At block S4, the internally threaded cylindrical adjuster sleeve is rotated around the externally threaded first end of the driven shaft of the pump. The rotation of the adjuster sleeve around the driven shaft of the pump may result in the threaded first end of the driven shaft screwing into or out of the internally threaded cylindrical adjuster sleeve. The adjuster sleeve may be at a fixed position with a driven hub. The adjuster sleeve may be spaced from the driven hub so that the adjuster sleeve can rotate around the driven shaft. Rotating the adjuster sleeve may adjust a position of the driven shaft with respect to the driven hub, and thereby may adjust a position of an impeller attached to a second end of the driven shaft with respect to a stationary bowl assembly of the pump.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for adjusting a position of impellers within a bowl assembly of a pump, the device comprising: a spacer coupling, wherein a first end of the spacer coupling is connected to a drive hub and a second end of the spacer coupling is connected to a driven hub, and the spacer coupling is configured to be adjusted at any angle; and an adjuster at the second end of the spacer coupling, wherein the adjuster excludes a fastener passing through the adjuster and includes an adjuster sleeve, the adjuster sleeve is a cylindrical sleeve with an internal side and an external side, the adjuster sleeve is threaded on the internal side, the adjuster sleeve is maintained at a fixed location within a cavity defined by internal walls of the driven hub and radially spaced from the driven hub so that the adjuster sleeve can rotate around a driven shaft, the adjuster sleeve threadedly mates and engages with an externally threaded first end of the driven shaft when the adjuster sleeve is rotated, and the rotation of the adjuster sleeve adjusts a position of the driven shaft with respect to the driven hub and thereby adjusts a position of an impeller attached to a second end of the driven shaft with respect to a stationary bowl assembly of the pump.

2. The device of claim 1, further comprising a set screw threaded through an opening defined by walls of the driven hub, wherein the set screw contacts and secures a rotational position of the adjuster sleeve relative to the driven hub.

3. The device of claim 1, wherein the spacer coupling is rigid and is comprised of steel.

4. The device of claim 1, wherein the drive hub is connected to a drive shaft and the drive shaft is connected to a drive motor.

5. The device of claim 1, wherein the driven hub is connected to the driven shaft axially so that driven shaft rotates with the driven hub.

6. The device of claim 1, wherein the driven hub is connected to the driven shaft axially with a key.

7. The device of claim 1, wherein the spacer coupling is attached to the drive hub with drive hub bolts through spacer coupling flanges and drive hub flanges.

8. The device of claim 1, wherein the spacer coupling is attached to the driven hub with driven hub bolts through spacer coupling flanges and driven hub flanges.

9. The device of claim 1, wherein the adjustment to the position of the driven shaft is any linear distance within a length of the adjuster sleeve.

10. A pump system for adjusting a position of impellers within a bowl assembly of a pump, the system comprising: a driver; a drive shaft, wherein the drive shaft is rotationally driven by the driver; a drive hub, wherein the drive hub is connected to the drive shaft; a spacer coupling, wherein a first end of the spacer coupling is connected to the drive hub and a second end of the spacer coupling is connected to the driven hub, and the spacer coupling is configured to be adjusted at any angle; a driven shaft, wherein the driven shaft is connected to the driven hub at a key proximate to a first end of the driven shaft; a column, wherein the driven shaft extends through the column; an impeller, wherein the impeller is attached to a second end of the driven shaft; a bowl assembly, wherein the bowl assembly is connected to the column; an adjuster at the second end of the spacer coupling, wherein the adjuster excludes a fastener passing through the adjuster and includes an adjuster sleeve, the adjuster sleeve is a cylindrical sleeve with an internal side and an external side, the adjuster sleeve is threaded on the internal side, the adjuster sleeve is maintained at a fixed location within a cavity defined by internal walls of the driven hub and radially spaced from the driven hub so that the adjuster sleeve can rotate around the driven shaft, and the adjuster sleeve threadedly mates and engages with an externally threaded first end of the driven shaft when the adjuster sleeve is rotated, the rotation of the adjuster sleeve adjusts a position of the driven shaft with respect to the driven hub and thereby adjusts a position of an impeller attached to a second end of the driven shaft with respect to the stationary bowl assembly of the pump.

11. The system of claim 10, further comprising a set screw threaded through an opening defined by walls of the driven hub, wherein the set screw contacts the adjuster sleeve and secures a rotational position of the adjuster sleeve relative to the driven hub.

12. The system of claim 10, wherein the spacer coupling is rigid and is comprised of steel.

13. The system of claim 10, wherein the drive hub is connected to the drive shaft axially with a first key so that drive hub rotates with drive shaft and the driven hub is connected to the driven shaft axially with a second key so that driven shaft rotates with driven hub.

14. The system of claim 10, wherein the adjustment to the position of the driven shaft is any linear distance within a length of the adjuster sleeve.

15. A method to adjust a position of an impeller of a pump, the method comprising: threadedly mating and engaging an internally threaded cylindrical adjuster sleeve with an externally threaded first end of a driven shaft of a pump; and rotating the internally threaded cylindrical adjuster sleeve around the externally threaded first end of the driven shaft of the pump, wherein rotating the adjuster sleeve results in the threaded first end of the driven shaft screwing into or out of the internally threaded cylindrical adjuster sleeve, the adjuster sleeve is maintained at a fixed location within a cavity defined by internal walls of a driven hub, the adjuster sleeve is radially spaced from the driven hub so that the adjuster sleeve can rotate around the driven shaft, the adjuster sleeve is arranged to affect an adjustment of any linear distance within a length of the adjuster sleeve within a tolerance of about +/−0.002 inches; and rotating the adjuster sleeve adjusts a position of the driven shaft with respect to the driven hub, and thereby adjusts a position of an impeller attached to a second end of the driven shaft with respect to a stationary bowl assembly of the pump.

16. The method of claim 15, further comprising tightening a set screw threaded through an opening defined by walls of the driven hub so that the set screw contacts the adjuster sleeve and secures a rotational position of the adjuster sleeve relative to the driven hub.

17. The method of claim 15, wherein a rigid spacer coupling includes the adjuster sleeve at a first end of the rigid spacer coupling, the first end of the rigid spacer coupling is connected to the driven hub, and a second end of the rigid spacer coupling is connected to a drive hub.

18. The method of claim 17, wherein the rigid spacer coupling is steel.

19. The method of claim 15 wherein rotating the adjuster sleeve around the driven shaft increases or decreases an amount of threaded mating between the adjuster sleeve and the driven shaft to adjust a position of the driven shaft relative to the driven hub.

\* \* \* \* \*